United States Patent Office 3,435,657
Patented Apr. 1, 1969

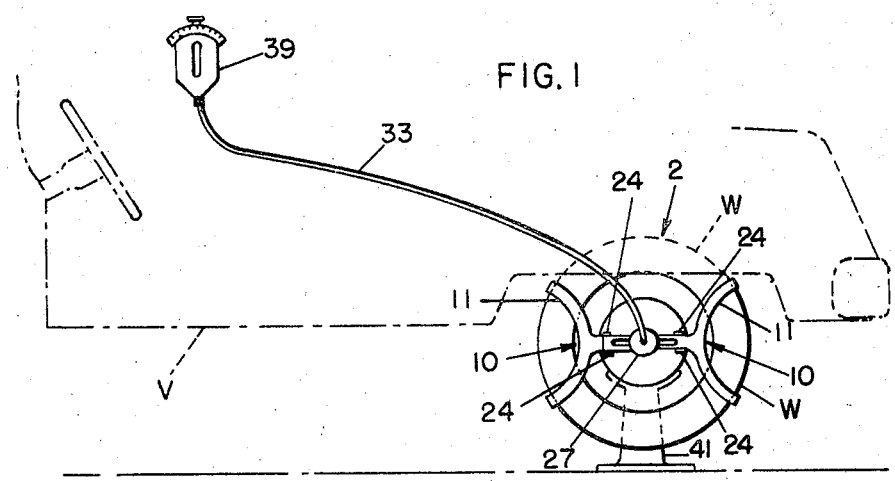
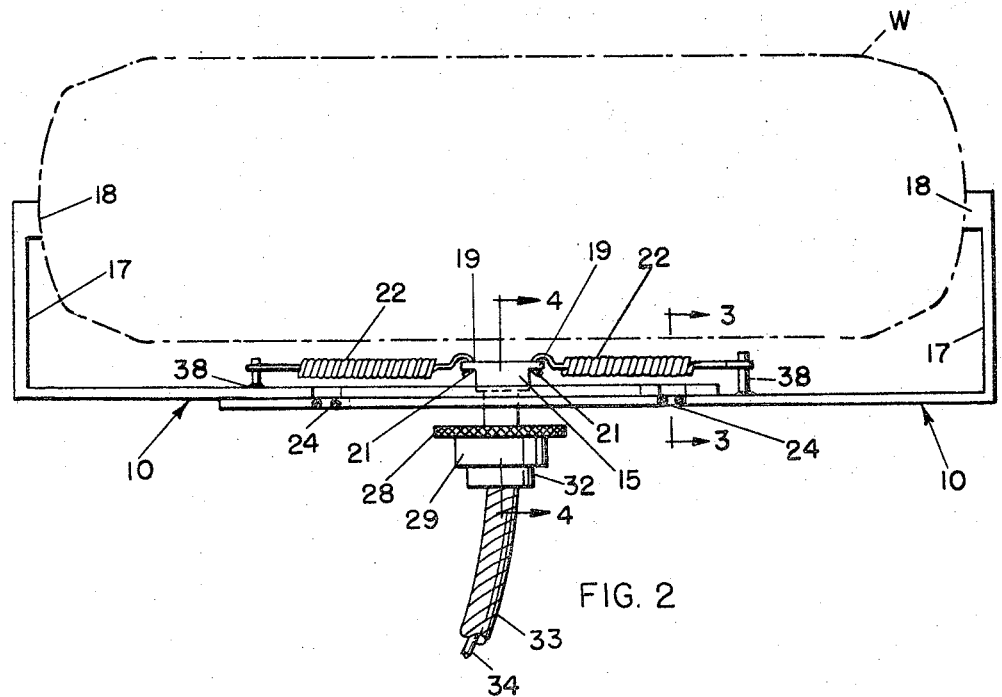
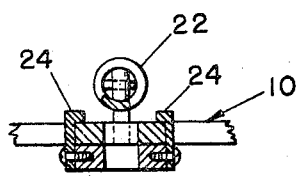

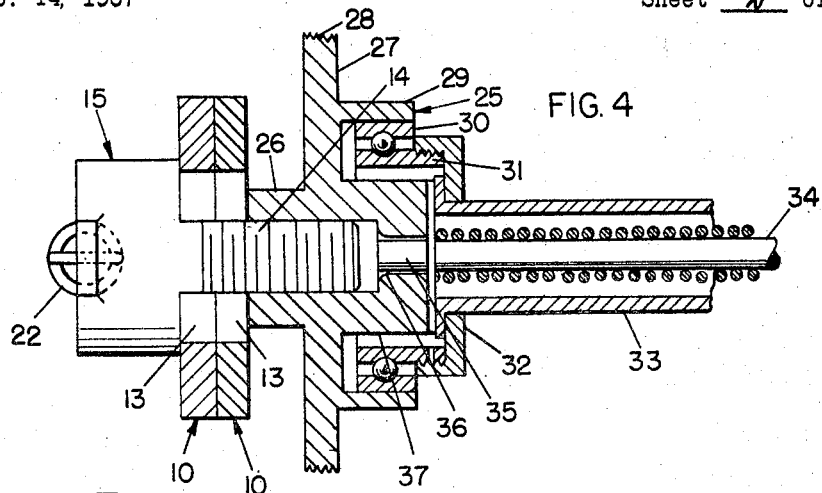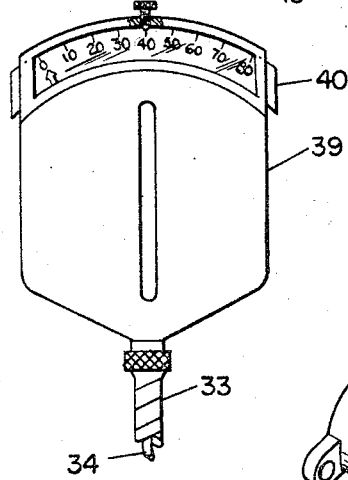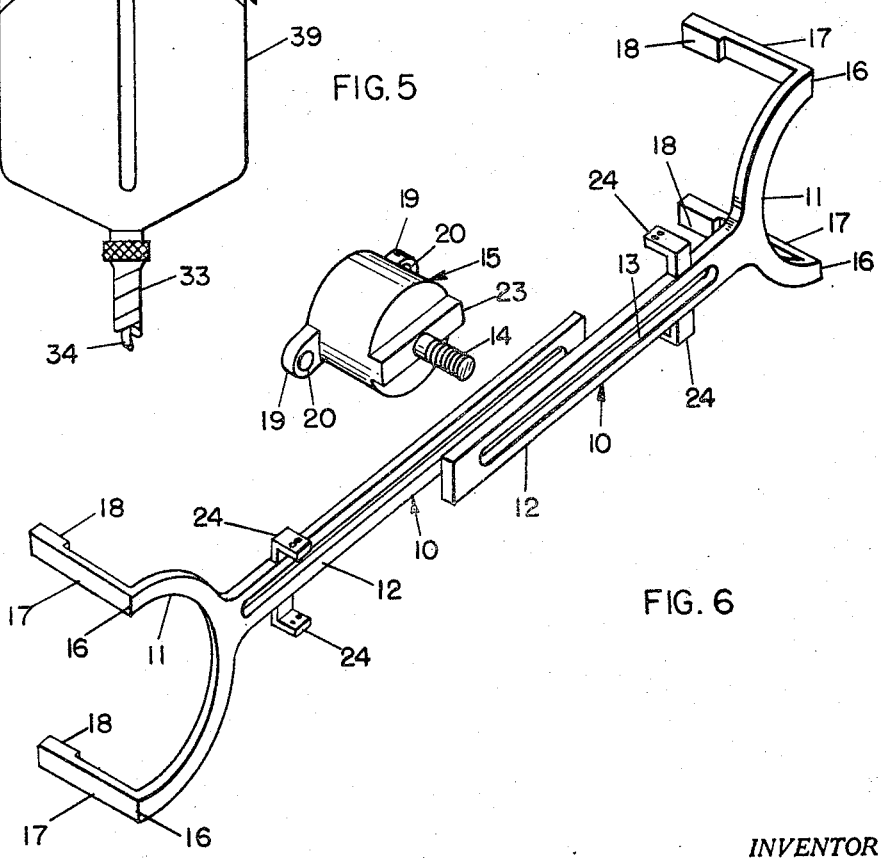

3,435,657
PORTABLE SPEEDOMETER CHECKING DEVICE
FOR AUTOMOTIVE VEHICLES
David Weissman, 1320 McKinley St.,
Philadelphia, Pa. 19111
Filed Feb. 14, 1967, Ser. No. 616,016
Int. Cl. G01c 25/00
U.S. Cl. 73—2      5 Claims

ABSTRACT OF THE DISCLOSURE

An automotive speedometer tester comprises two Y-shaped clamps. The clamps are secured to a rear wheel that has been raised. A speedometer shaft is connected by the clamps from the wheel to a master speedometer located near the speedometer being tested.

---

This invention relates to speedometers, and more particularly, to a device for checking the accuracy of the speedometer of an automotive vehicle.

My invention consists of two Y-shaped clamps that are secured to the outside of one of the rear wheels of an automotive vehicle after the wheels have been placed on a suitable jack. These two Y-shaped clamps are suitably secured together by means of an especially designed mechanism to which is also secured one end of a speedometer cable that has its other end fastened to a portable master speedometer that is placed in the vehicle. The person who is checking the speedometer of the car can now see both speedometers at the same time as he checks the speedometer of the vehicle for accuracy by the method herein described.

The principal object of this invention is to provide a portable speedometer checking device for automotive vehicles that permits one to quickly and efficiently check the speedometer of any automotive vehicle at any time and in any place.

Another object of this invention is to provide a portable speedometer checking device for automotive vehicles that can be attached to one of the rear wheels of any automotive vehicle in a minimum of time and without the use of special tools.

Still another object of this invention is to provide a portable speedometer checking device for automotive vehicles that embodies a master speedometer having a hand that can be adjusted, replaceable dials or indicator cards are also a part of this speedometer which can be calibrated to compensate for different gear ratios that drive the speedometer of the vehicle that is being checked for accuracy.

Other and further objects of this invention and other advantages will come to mind as the reading of this specification and its appended claims proceeds and the accompanying drawings are examined.

In the drawings:

FIG. 1 is a side view of this invention secured to one of the rear wheels of an automotive vehicle for the checking of the accuracy of its speedometer; the vehicle being outlined in phantom lines.

FIG. 2 is a horizontally disposed top view of that part of this invention that is indicated by the vertical arrowed line and the numeral 2 in FIGURE 1.

FIG. 3 is a sectional view of a portion of this invention, taken substantially along line 3—3 of FIGURE 2, and viewed in the direction indicated by the arrows.

FIG. 4 is an enlarged sectional view of that portion of this invention, taken substantially along line 4—4 of FIGURE 2, and viewed in the direction indicated by the arrows.

FIG. 5 is a front view of the master speedometer that is a part of this invention.

FIG. 6 is an exploded pictorial view of the two Y-shaped clamps and part of the device that secures the clamps to one of the rear wheels of an automotive vehicle.

In the drawings like parts are indicated by like reference characters throughout the several views.

Looking first at FIGURES 1, 2, and 6, it will be seen that there are two Y-shaped clamps 10. Each clamp embodies a U-shaped end 11, having an integrally formed stem 12 in which is located an elongated opening 13 through which is placed the threaded screw 14 of the block 15. Each of the ends 16 of the aforesaid U-shaped ends 11 terminate in a right-angled member 17 that has rectangular hook 18 on the end thereof, best shown in FIGURE 2 and in FIGURE 6 of the drawings. The aforesaid block 15 is round, when viewed from the front, and is provided with two opposed ears 19 having an opening 20 therein for the reception of the hook end 21 of the coil spring 22. The aforesaid block 15 is also provided with an integrally formed rectangular member 23 that is adapted to fit into the elongated opening 13 of one of the aforesaid Y-shaped clamps 10. The only difference between the two clamps is that one is made right-handed and one left-handed. Since both clamps are otherwise equal, they are indicated in the drawings by the same reference characters. An L-shaped guide 24 is integrally formed on the top and bottom of each of the aforesaid stems 12 in order to assist in holding the two clamps 10 in place on the wheel of the automotive vehicle. The wheel is indicated by the capital letter W and the vehicle by the capital letter V.

Directing one's attention now to FIGURE 4 and then to FIGURE 2, it will be seen that the aforesaid threaded screw 14 of the block 15 is screwed into the wheel clamp 25 that has an integrally formed hub 26. This integrally formed hub 26 slidably fits into the aforesaid elongated openings 13 of each of the two Y-shaped clamps 10 when the invention is assembled onto the aforesaid wheel W of the automotive vehicle V. The aforesaid hub 26 is provided with a circular member 27 that has a knurled periphery 28 by which this part of the invention may be hand-assembled onto the wheel W. An integrally formed bearing cup 29 is located on the opposite face of the aforesaid circular member 27 from that of the aforesaid hub 26, as is clearly shown in FIGURE 4 of the drawings. The ball-bearing 30, having an externally threaded and extended member 31, is located in the aforesaid bearing cup 29. The aforesaid member 31 is screwed into the internally threaded shaft nut 32 of the flexible shaft housing 33 in which is located the flexible shaft 34. This flexible shaft 34 has its square end 35 extending into the square opening 36 which is in the center of the second hub 37 that is also integrally formed with the aforesaid circular meber 27 of this invention. This just described assembled mechanism permits the aforesaid flexible shaft 34 to rotate when the wheel W of the vehicle rotates, as will be fully understood by anyone experienced in the mechanical arts when the accompanying drawings are examined in detail.

The purpose of the aforesaid ball-bearing 30 is to allow the threaded shaft nut 32 and the externally threaded member 31, as well as the aforesaid flexible shaft housing 33, to remain stationary as the flexible shaft 34 rotates.

It is obvious from examination of FIGURE 2 of the drawings that the aforesaid coil springs 22 automatically keep the two Y-shaped clamps 10 pulled inward with their hooks 10 held firmly against the periphery of the tire 35. The outer end of each of the aforesaid coil springs 22 is hooked over the outer end of the pins 38, which have their inner ends suitably secured to the stems 12 of the often mentioned Y-shaped clamps 10, thereby causing the clamps and their associated parts to rotate when the wheel of the vehicle is rotated by its engine.

Returning now to the aforesaid flexible shaft 34, it will be seen on examination of FIGURE 1 of the drawings that this flexible shaft has its other end connected to the master speedometer 39 in the usual manner known to those experienced in the art. The aforesaid master speedometer 39 is provided with any desired number of interchangeable dials or indicator cards 40 for the already stated purpose of permitting this invention to be used on vehicles having different gear ratios.

From the foregoing, it is seen that I have herein provided a new and useful as well as novel portable speedometer checking device for automotive vehicles that requires only the connecting of this invention up in the manner shown in FIGURES 1, 2, 3, and 4 of the accompanying drawings. The clamps 10 are further tightened by turning the aforesaid knurled periphery 28 of the circular member 27 as far as it will go. The vehicle wheels are placed on any suitable jack 41 before the engine of the car is started and the wheels placed in rotation by the usual manner. With the aforesaid master speedometer 39 in sight of the regulator speedometer of the vehicle one can readily see how far off the speedometer of the vehicle really is. The necessary adjustments can then be made on the speedometer of the automotive vehicle as will be understood by anyone fully versed in the speedometer adjusting arts.

This invention is subject to any change and/or modifications one may care to make in so long as the changes and/or modifications fall within the scope and intent of the appended claims.

What I now claim as new is:

1. A portable speedometer checking device for automotive vehicles comprising two Y-shaped clamps adapted to be secured to the outside of the rear wheel of any automotive vehicle whose speedometer is to be checked for accuracy; mechanism securing the said two Y-shaped clamps together at the center of the said wheel; a flexible shaft secured to the said mechanism to rotate with said clamps and wheel after the rear wheels of the said vehicle have been placed on a jack and when the said wheels are rotated by the engine of the said vehicle; a master speedometer connected to the other end of said flexible shaft; said master speedometer being adapted to be in the said vehicle and near the speedometer that is being checked.

2. The invention of claim 1, wherein each of the said Y-shaped clamps is provided with a U-shaped end having right angled members formed thereon that in turn have their outer ends terminating in rectangular hooks that firmly press against the periphery of the tire of one of the wheels of the said vehicle.

3. The invention of claim 2, wherein the said Y-shaped clamps are spring-loaded.

4. The invention of claim 3, wherein the said mechanism embodies a round block; a rectangular member integrally formed therewith; an integrally formed screw extending outwardly from said member; a circular member having a knurled periphery; an internally threaded hub that projects outwardly from the center of said circular member and onto said screw; an integrally formed bearing cup extending outwardly from the other side of said circular member; a ball-bearing in the said cup; said ball-bearing having an externally threaded and extended member; an internally threaded shaft nut; a shaft housing; said member of said ball-bearing being screwed into said shaft nut to thereby hold said shaft nut and said flexible shaft thereto; a second integrally formed hub extending outwardly from said circular member; said second hub having a square recess; and said flexible shaft having a square end that fits into said square recess, thereby providing a means of securing the shaft of the said master speedometer to said wheel.

5. The invention of claim 4, wherein the said master speedometer is provided with a number of calibrated dials or indicator cards.

References Cited

UNITED STATES PATENTS 2,781,659 2/1957 Parker _____ 73—2
3,178,927 4/1965 MacMillan _____ 73—2

LOUIS R. PRINCE, *Primary Examiner.*

J. NOLTON, *Assistant Examiner.*

U.S. Cl. X.R.

73—493